Patented Oct. 19, 1943

2,332,066

UNITED STATES PATENT OFFICE 2,332,066

PRINTING INK VARNISH AND COATING

Donald Robert Erickson and Paul J. Thoma, Kalamazoo, Mich., assignors to Michigan Research Laboratories, Inc., Kalamazoo, Mich.

No Drawing. Application June 2, 1941,
Serial No. 396,291

4 Claims. (Cl. 106—152)

This invention relates to improvements in printing ink varnish and coating.

This invention relates to a varnish for use either in printing inks or as a coating. It has for its objects:

First, to provide a new and improved varnish of the type described.

Second, to provide such a varnish which is quick drying and is relatively hard and gives a scuff resistant film which is flat and which is particularly useful in inks where colors simulating water colors, but not soluble in water, are desired.

Third, to provide such a varnish in which zein is incorporated.

Fourth, to provide such a varnish which has sufficient water tolerance to resist separation of the binder from the solvent used even in high humidities, but which can be used in inks which may be subjected to the action of water after printing to form a film of binder over the top thereof to prevent offset.

Other objects and advantages pertaining to details will appear from the description to follow.

Our new and improved varnish uses as one constituent zein, a protein material commonly obtained from corn. It is classified as a prolamine type of protein. Zein is soluble in liquid polyglycols, but if such solutions are used as varnishes, practical difficulties are encountered. Agitation of the solution will tend to cause the zein to gel and humidity conditions may tend to separate the zein from the solvent.

If anhydrous solvents are used, the zein may be kept from gelling or separating for a considerable length of time, but this presents practical problems. When the solution is used in a varnish for coating or in a printing ink, beating and aeration of the varnish by the rollers for applying it either to the material to be coated or to the plates of a press may tend to cause gelling and may tend to beat water into the varnish, causing separation of the zein from the solvent. Polyglycols are hygroscopic in nature and tend to pull moisture into the varnish from the air, aggravating this condition.

We have found that if a varnish is made using zein as a portion of the binder and using with it a resin comprising either a rosin or a terpene hydrocarbon of the formula $C_{10}H_{16}$ modified by an alpha beta unsaturated organic polybasic acid, such as maleic or fumaric, with a liquid polyglycol for the solvent, the varnish has water tolerance and the binder including the zein will not be separated from the solvent even by high humidity conditions encountered in using the varnish either as a coating or in a printing ink.

As a resin comprising a rosin modified by an alpha beta unsaturated organic polybasic acid, we can use the material sold under the trade name "Teglac 127." As a resin comprising a terpene hydrocarbon of the formula $C_{10}H_{16}$ modified by an alpha beta unsaturated organic polybasic acid, we may use the material sold under the trade name "Petrex Acid." We may use mixtures of these resins.

Typical examples of a varnish embodying our invention are as follows:

|  | Parts by weight |
|---|---|
| 1. Diethylene glycol | 56 |
| "Teglac 127" | 40 |
| Zein | 4 |
| 2. Diethylene glycol | 56 |
| "Petrex Acid" | 40 |
| Zein | 4 |

We have found that the water tolerance of the varnish using the zein may be improved materially if the zein is modified either with an alpha beta unsaturated organic polybasic acid such as maleic or fumaric as set forth in our application filed June 2, 1941, Serial No. 396,289, entitled "Modified zein and method," or if the zein is modified with an organic hydroxy acid, such as malic, gluconic, citric, tartaric or lactic, as set forth in our application filed June 2, 1941, Serial No. 396,299, entitled "Modified zein and method." The modified zein is used in the same proportions as in the examples set forth above for the unmodified zein.

The varnish made in accordance with our invention is relatively inexpensive, is fast drying, and gives a hard scuff-resistant film. When used in an ink it has a flat appearance and is useful in inks simulating water colors. The varnish has sufficient water tolerance so that the binder will not separate from the polyglycol used as a solvent, even when high humidity atmospheric conditions are encountered. Water may be used either as steam or water sprays, for example, to prevent offset by separating some of the binder from the solvent at the surface of a film of the varnish to form a thin impervious film over the surface thereof. The amounts of zein may be varied to vary the speed of setting or hardening of the ink, since an increase in the amount speeds up the hardening. This amount may be varied from ½% to 5% of the weight of the varnish. The body of the ink is superior and the ink is readily workable.

The terms and expressions which have been herein employed are used as terms of description and not of limitation. There is no intention in the use of such terms and expressions of excluding any equivalents of the features shown and described or portions thereof, but it is recognized that various modifications are possible within the scope of the invention claimed.

Having thus described our invention, what we claim as new and desire to secure by Letters Patent is:

1. A varnish for printing ink stable against separation of the binder at high atmospheric humidity conditions comprising 56 per cent by weight of a liquid polyglycol, as a solvent for the binder and a binder comprising 40 per cent by weight of a resin selected from the group consisting of a resin comprising rosin modified by an alpha beta unsaturated organic polybasic acid and a terpene hydrocarbon of the formula $C_{10}H_{16}$ modified by an alpha beta unsaturated organic polybasic acid, and 4 per cent by weight of zein.

2. A varnish for printing ink stable against separation of the binder at high atmospheric humidity conditions comprising liquid polyglycol, as a solvent for the binder and a binder comprising a resin selected from the group consisting of a resin comprising rosin modified by an alpha beta unsaturated organic polybasic acid and a terpene hydrocarbon of the formula $C_{10}H_{16}$ modified by an alpha beta unsaturated organic polybasic acid, and from ½% to 5% of zein.

3. A varnish for printing ink stable against separation of the binder at high atmospheric humidity conditions comprising 56 per cent by weight of a liquid polyglycol, as a solvent for the binder and a binder comprising 40 per cent by weight of a resin selected from the group consisting of a resin comprising rosin modified by an alpha beta unsaturated organic polybasic acid and a terpene hydrocarbon of the formula $C_{10}H_{16}$ modified by an alpha beta unsaturated organic polybasic acid, and 4 per cent by weight of zein modified by an acid selected from the group consisting of alpha beta unsaturated organic polybasic acids and organic hydroxy acids.

4. A varnish for printing ink stable against separation of the binder at high atmospheric humidity conditions comprising a liquid polyglycol, as a solvent for the binder and a binder comprising a resin selected from the group consisting of a resin comprising rosin modified by an alpha beta unsaturated organic poly basic acid and a terpene hydrocarbon of the formula $C_{10}H_{16}$ modified by an alpha beta unsaturated organic polybasic acid, and from ½% to 5% of zein modified by an acid selected from the group consisting of alpha beta unsaturated organic polybasic acids and organic hydroxy acids.

DONALD ROBERT ERICKSON.
PAUL J. THOMA.